US009942793B2

(12) United States Patent
Gerasimenko et al.

(10) Patent No.: US 9,942,793 B2
(45) Date of Patent: Apr. 10, 2018

(54) SYSTEMS AND METHODS FOR CONTENTION MANAGEMENT AND QUALITY OF SERVICE ESTIMATION IN HETEROGENEOUS WIRELESS NETWORKS

(71) Applicant: INTEL IP CORPORATION, Santa Clara, CA (US)

(72) Inventors: Mikail Gerasimenko, Tampere (FI);
Nageen Himayat, Fremont, CA (US);
Sergey Andreev, Tampere (FI);
Yevgeni Koucheravy, Tampere (FI);
Shu-Ping Yeh, New Taipei (TW);
Huaning Niu, Milpitas, CA (US);
Jeongho Jeon, San Jose, CA (US);
Mo-Han Fong, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 253 days.

(21) Appl. No.: 14/582,023

(22) Filed: Dec. 23, 2014

(65) Prior Publication Data

US 2015/0271848 A1    Sep. 24, 2015

Related U.S. Application Data

(60) Provisional application No. 61/969,787, filed on Mar. 24, 2014.

(51) Int. Cl.
*H04W 28/02* (2009.01)
*H04L 12/851* (2013.01)
(Continued)

(52) U.S. Cl.
CPC ........... *H04W 28/0247* (2013.01); *H04L 1/00* (2013.01); *H04L 47/2433* (2013.01);
(Continued)

(58) Field of Classification Search
CPC ............ H04W 76/022; H04W 74/085; H04W 28/0247; H04W 88/06; H04W 72/00;
(Continued)

(56) References Cited

U.S. PATENT DOCUMENTS 6,721,281 B1 * 4/2004 Dick ................... H04W 74/006
370/252
8,155,102 B1    4/2012 Hakola et al.
(Continued)

FOREIGN PATENT DOCUMENTS

JP    2000031968 A    1/2000
JP    2012531089 A    12/2012
(Continued)

OTHER PUBLICATIONS

PCT/US2015/016501, International Search Report and Written Opinion, dated May 26, 2015, 9 pages.
(Continued)

*Primary Examiner* — Hanh N Nguyen
(74) *Attorney, Agent, or Firm* — Stoel Rives LLP

(57) ABSTRACT

A user equipment (UE) is configured to receive a maximum probability of accessing a wireless local area network (WLAN) for communication. The maximum probability is received via a 3rd Generation Partnership Project (3GPP) communication link with an Evolved Universal Terrestrial Radio Access Network (E-UTRAN) Node B (eNB). The UE is further configured to determine that there is a queued transmission for the UE and, in response to determining that there is a queued transmission, to determine whether the UE is authorized to access to the WLAN using a probability less than or equal to the maximum probability. The UE is further configured to delay contention for access to the WLAN for at least a pre-backoff duration in response to determining that the UE is not authorized.

18 Claims, 10 Drawing Sheets

(51) Int. Cl.
*H04L 1/00* (2006.01)
*H04W 16/32* (2009.01)
*H04W 74/08* (2009.01)
*H04W 84/12* (2009.01)
*H04W 88/06* (2009.01)

(52) U.S. Cl.
CPC ....... *H04W 16/32* (2013.01); *H04W 74/0841* (2013.01); *H04W 84/12* (2013.01); *H04W 88/06* (2013.01)

(58) Field of Classification Search
CPC ... H04W 48/18; H04W 48/20; H04W 72/005; H04W 72/12; H04W 36/14; H04W 36/16; H04W 36/24; H04W 74/08; H04W 74/04; H04W 74/0808; H04W 74/0833; H04W 74/0816; H04W 74/006
USPC ....... 370/328–330, 445, 448, 461, 462, 230, 370/216–220, 231–235
See application file for complete search history.

(56) References Cited

U.S. PATENT DOCUMENTS

| | | | |
|---|---|---|---|
| 9,088,976 B2* | 7/2015 | Islam | H04W 76/022 |
| 9,094,942 B2* | 7/2015 | Wiberg | H04W 74/006 |
| 9,532,385 B2* | 12/2016 | Lee | H04W 74/0833 |
| 2005/0036448 A1 | 2/2005 | Leeuwen | |
| 2010/0323698 A1 | 12/2010 | Rune et al. | |
| 2012/0051338 A1 | 3/2012 | Seok | |
| 2013/0023301 A1 | 1/2013 | Wang et al. | |
| 2013/0083783 A1 | 4/2013 | Gupta et al. | |
| 2013/0170479 A1 | 7/2013 | Fong et al. | |
| 2014/0003239 A1 | 1/2014 | Etemad et al. | |
| 2014/0133294 A1* | 5/2014 | Horn | H04W 28/0247 370/230 |
| 2015/0256961 A1* | 9/2015 | Kim | H04W 74/085 370/329 |

FOREIGN PATENT DOCUMENTS

| | | |
|---|---|---|
| WO | 2005006661 A1 | 1/2005 |
| WO | 2010147527 A1 | 12/2010 |
| WO | 2013149387 A1 | 10/2013 |
| WO | 2013185653 A1 | 12/2013 |
| WO | 2014043494 A1 | 3/2014 |

OTHER PUBLICATIONS

Wi-Fi Alliance, "Wi-Fi Certified for WMM—Support for Multimedia Applications with Quality for Service in Wi-Fi Networks", Sep. 1, 2004, 15 pages.

* cited by examiner

SYSTEMS AND METHODS FOR CONTENTION MANAGEMENT AND QUALITY OF SERVICE ESTIMATION IN HETEROGENEOUS WIRELESS NETWORKS

RELATED APPLICATION

This application claims the benefit under 35 U.S.C. § 119(e) of U.S. Provisional Application No. 61/969,787, filed Mar. 24, 2014, which is hereby incorporated by reference herein in its entirety.

TECHNICAL FIELD

The present disclosure relates to contention management and quality of service estimation in heterogeneous wireless networks.

DETAILED DESCRIPTION OF PREFERRED EMBODIMENTS

Figure 1:
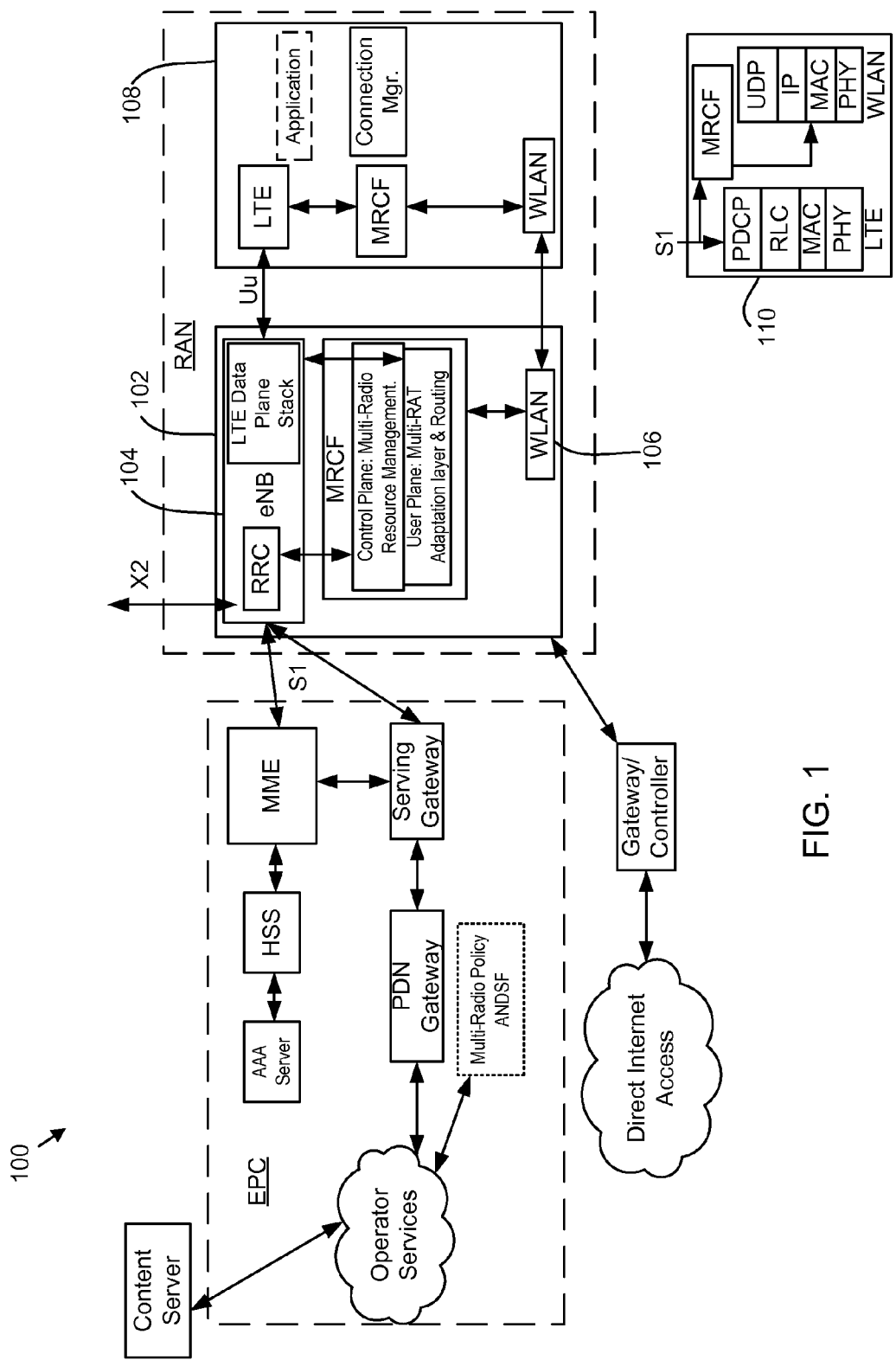
FIG. 1 is a schematic diagram illustrating an example system for wireless communication.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a node (e.g., a transmission station or a transceiver node) and a wireless device (e.g., a mobile communication device). Some wireless devices communicate using orthogonal frequency division multiple access (OFDMA) in a downlink (DL) transmission and single carrier frequency division multiple access (SC-FDMA) in an uplink (UL) transmission. Standards and protocols that use orthogonal frequency division multiplexing (OFDM) for signal transmission include the 3rd Generation Partnership Project (3GPP) long term evolution (LTE) Rel. 8, 9 and 10; the Institute of Electrical and Electronics Engineers (IEEE) 802.16 standard (e.g., 802.16e, 802.16m), which is commonly known to industry groups as WiMAX (Worldwide interoperability for Microwave Access); and the IEEE 802.11-2012 standard, which is commonly known to industry groups as WiFi.

In a 3GPP radio access network (RAN) LTE system, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The DL transmission may be a communication from the node (e.g., eNB) to the wireless device (e.g., UE), and the UL transmission may be a communication from the wireless device to the node.

In homogeneous networks, a node, also called a macro node or macro cell, may provide basic wireless coverage to wireless devices in a cell. The cell may be the area in which the wireless devices are operable to communicate with the macro node. Heterogeneous networks (HetNets) may be used to handle the increased traffic loads on the macro nodes due to increased usage and functionality of wireless devices. HetNets may include a layer of planned high power macro nodes (macro-eNBs or macro cells) overlaid with layers of lower power nodes (small cells, small-eNBs, micro-eNBs, pico-eNBs, femto-eNBs, or home eNBs [HeNBs]) that may be deployed in a less well-planned or even entirely uncoordinated manner within the coverage area (cell) of a macro node. The lower power nodes may generally be referred to as "small cells," small nodes, or low power nodes.

As used herein, the terms "node" and "cell" are both intended to be synonymous and refer to a wireless transmission point operable to communicate with multiple wireless mobile devices, such as a UE, or another base station, such as an eNB or a low power node. Furthermore, cells or notes may also be WiFi APs, or multi-radio cells with both WiFi/cellular or additional RATs. For example, nodes or cells may include various technologies such that cells operating on different RATs are integrated in one unified network.

FIG. 1 is a schematic block diagram illustrating a portion of a communications network 100 that includes a small cell 102 with integrated multi-radio architecture. The small cell 102 includes an integrated multi-radio access technology (RAT) HetNet architecture with collocated wireless local area network (WLAN) and 3GPP interfaces. Specifically, the multi-RAT small cell 102 may include an eNB 104 and a WLAN access point (AP) 106, which provide communication services to one or more multi-RAT UEs 108. Multi-radio small cells, like the small cell 102, facilitate tightly coupled WLAN/3GPP architectures where WLAN is a secondary virtual carrier anchored on a 3GPP link. Here, the 3GPP link and network provide the control and mobility anchor, and WLAN is used as a data pipe under 3GPP control. In other words, the WLAN link is used as a virtual carrier in the 3GPP network. Thus, the WLAN is used as a virtual (L2) data pipe where 3GPP bearers may be tunneled across WiFi with no changes to the WLAN interface. Although the architecture may leverages integrated multi-radio cells where WLAN and LTE are collocated, the present disclosure also applies to non-collocated WLAN/cellular cells which are connected through a proprietary or standardized interface.

The eNB 104 includes a radio resource control (RRC) component that provides RRC layer functionality and an LTE data plane stack. The eNB 104 and WLAN AP 106 interface with each other via a multi-RAT coordination function (MRCF). The MRCF provides functions for a control plane for multi-radio resource management and functions for a user plane for multi-RAT adaptation layer and routing. Block 110 illustrates how, in one embodiment, the MRCF interfaces with a data plane stack of LTE and a protocol stack of WLAN. The LTE data plane stack includes a physical (PHY) layer, medium access control (MAC) layer, radio link control (RLC) layer, and packet data convergence protocol (PDCP) layer. The WLAN stack includes a PHY layer, MAC layer, IP layer, and user datagram protocol (UDP). The MRCF interfaces with the S1 interface and PDCP layer of LTE and the MAC layer of WLAN.

The UE 108 includes a multi-RAT UE that can communicate with the small cell 102 using two or more RATs, e.g. a 3GPP RAT and a WLAN RAT. The UE 108 provides LTE functionality for communicating with the small cell 102 over a 3GPP link (e.g., a multi-RAT aware Uu interface) and WLAN functionality for communicating with the small cell 102 over a WLAN link. The LTE and WLAN functionality of the UE 108 interface with each other via an MRCF. The UE 108 also includes one or more applications and a connection manager.

The small cell 102 may be in communication with one or more other small cells, macro cells, or other nodes via an X2 interface. The small cell 102 is also in communication with an evolved packet core (EPC). In one embodiment, a WLAN AP may be deployed separately from the LTE small cells wherein the two nodes will have an interface to share the required information. The EPC includes, among other components/functions, a mobility management entity (MME), a home subscriber server (HSS), an authentication authorization and accounting (AAA) server, a serving gateway, a packet data network (PDN) gateway, and a multi-radio policy access network discover and selection function (ANDSF). The EPC provides operator services such as access to the Internet, an Internet Protocol (IP) multimedia subsystem (IMS), and one or more external content servers. The small cell 102 also provides communication via a gateway/controller to direct Internet access. For example, local offload is supported for LTE/WiFi traffic that does not require 3GPP services (i.e., does not need to be routed via the EPC.

Applicants have recognized a need for WiFi contention management and load balancing in many practical HetNet scenarios where bidirectional traffic flows coexist, (e.g., transmission in both UL and DL directions), or when there is a need to control how resources are shared amongst the nodes in the network. For many densely populated areas, such as conference halls, restaurants, and airports, the UL/DL imbalance is typically very strong due to the high number of communicating users. Consider an example scenario where all UL users are located in the coverage area of one WiFi AP. Due to similar treatment of UL and DL directions in the conventional WiFi protocols, the UL users and AP contend directly through Carrier Sense Multiple Access with Collision Avoidance (CSMA/CA) MAC mechanism. However, CSMA/CA does not explicitly take into account the fact that the load in UL and DL could be very asymmetric. Consider, for instance, several UEs connected to a single AP and residing on the same channel, and assume they stream full-buffer traffic (saturated load situation). In that case, the effective throughput of each particular user after fair contention will be roughly proportional to 1/N, where N is the number of active users in the system (plus the AP). Here, the throughput of the AP will also be proportional to 1/N, while the actual throughput demand in the DL direction may be on the order of N*Tn, where Tn is the DL traffic demand of each (identical) user.

The above scenario shows that in heavily loaded scenarios, the required throughput on the DL may need to be much higher than the per-user UL throughput, while for practical protocol operation, throughput on the DL vanishes with the growing number of users in the system. In a conventional WiFi channel access scheme, this contention may be managed by essentially two different mechanisms. First is the point coordination function (PCF) or other similar function. In PCF all user stations use a Contention Free Polling (CFP) mechanism. The PCF is not widely implemented by WLAN equipment. Second is the Wireless Multimedia Extensions (WME), which is part of 802.11e quality of service (QoS) features. The general principle of operation of the WME is stochastic prioritizing of traffic based on its QoS; e.g., multimedia streaming might have priority over the web browsing flows. See, for example, "Wi-Fi CERTIFIED for WMM—Support for Multimedia Applications with Quality of Service in Wi-Fi Networks," Wi-Fi Alliance, Sep. 1, 2004. However, these WME schemes control priorities across traffic flows and not necessarily the contention introduced by a particular node/user in the network. There have been other alternative proposals to coordinate DL/UL WiFi transmissions. However, in most cases they require significant protocol modifications or may not be easily implemented with current hardware.

In the present disclosure, Applicants present various systems, methods, and devices to improve control of WLAN QoS in HetNets. In one embodiment, contention between UL and DL of a WLAN network may be managed via the LTE control link (or other RAT). Additional embodiments may include managing in-network WLAN contention and load balance across available WLAN (and 3GPP) resources (e.g., across multiple multi-RAT small cells, or WLAN cells that are managed via a 3GPP controller). Furthermore, the methods presented herein may be extended to estimate WLAN QoS in the presence of rogue interference (interference not controlled by the network 100), and the 3GPP link may be used to alleviate any drop in WLAN QoS.

In one embodiment, the use of integrated, or multi-RAT, small cells allows for a tighter coordination between the two interfaces, with an opportunity to control information exchange via a common control interface. These benefits may be achieved based on teaching provided herein without any access protocol changes (e.g., changes to the WLAN RAT or standard). Exploiting LTE assistance in integrated multi-RAT HetNet deployments, the present disclosure proposes efficient mechanisms to control UL/DL (and more generally in-network WLAN) contention. In one embodiment, the methods and functions operate above the MAC layer and utilize information on the current loading on the multi-RAT small cell and the mix of traffic across users to balance the effective capacity of UL (across users) and DL. In one embodiment, a method includes partitioning the capacity on WLAN UL/DL according to the current traffic demand on the integrated small cell by assigning a probability of transmission to DL and UL users based on their traffic needs. In one embodiment, the allocated capacity may be partitioned across the different cells in the network via cooperation between the integrated small cells over an X2 interface.

There are several methods for partitioning WLAN capacity over the UL/DL WLAN links (such as time division scheduling for transmission or probabilistic sharing). In one embodiment, Applicants propose a pre-backoff mechanism to allocate such capacities. For example, the network may assign probabilities, using the LTE link, of DL and UL transmission for each UE over a WLAN link. In this disclosure, Applicants show that this is an effective method of partitioning capacity in the integrated system.

The methods, systems, and devices disclosed herein may provide a number of advantages and benefits over current and other proposed functionality. A first example advantage is that WLAN QoS can be managed via an operator on a reliable 3GPP link. A second example advantage is that LTE assistance can be used to manage UL/DL loads and in-network contention to target levels via a simple probabilistic method and without requiring complex contention management solutions or requiring changes to the WLAN MAC layer protocol. The partitioning of capacity may be adjusted dynamically based on current traffic demand of the users associated with the small cell (or admission control may be jointly performed based on controlling the available WLAN capacity). A third example advantage is that per-UE capacity may be configured through LTE control, which is not possible with existing WLAN control mechanisms. Configuration of capacity may depend on the expectation of the proportion of UL traffic configured for the particular UE.

A fourth example advantage is that the embodiments may be extended to control in-network contention between other WLAN APs managed by the operator, via cooperation over the X2 interface. More generally, cooperating operators may be able to coordinate the usage of WLAN resources by setting the transmission capacities, such that the available capacity is shared equally among them. A fifth example advantage is that, once the contention is controlled to target levels set in the network, rogue interference in the network may be detected through overload estimation, and appropriate actions may be taken to address overload (such as by moving traffic flows or users to a 3GPP network or link). Although the present disclosure discusses many embodiments in scenarios with integrated 3GPP-WLAN deployments, the disclosure contemplates that similar functionally may be extended to combinations of other RATs where one RAT does not involve contention while another RAT does involve contention. Furthermore, the present disclosure also contemplates and encompasses deployments where there are no integrated multi-RAT deployments such that different nodes implement different RATs utilizing contention or no contention based mechanisms Further discussion and details of example embodiments are provided below.

Based on shortcomings of current WiFi implementations, Applicants provide the following example requirements for a load balancing scheme: first, keep throughput in the DL direction (Tdl) independent of the number of UL users and their loads (e.g., Tdl is a constant); second, prevent DL MAC delay (Ddl) from dropping below a certain threshold value (if any DL traffic is being transmitted) (e.g., Ddl is less than a threshold value L). One of skill in the art will recognize that various other requirements may be used instead of or in addition to the above requirements without departing from the scope of the present disclosure.

Figure 2:
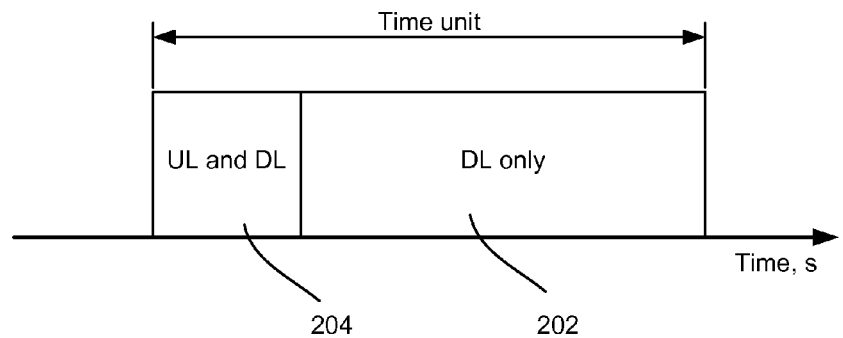
FIG. 2 is a schematic block diagram illustrating an example of a time division scheme.

Implementing load balancing according to the above requirements, or other requirements, may be performed in a variety of ways. A first way to implement load balancing is time division capacity sharing, which may be seen as a type of a Time Division Duplex (TDD), in which UL and DL directions could be allocated a proportion of air time. For example, DL transmissions may be allocated a time period during which no UL transmissions can occur, and UL transmissions may be allocated another time period where both UL and DL transmissions may occur. The relative lengths of the time periods may limit how much traffic is allowed in the UL direction, for example. However, TDD has several drawbacks, such as synchronization problems and the choice of proper time scaling. Furthermore, frequent time switches of a user will most probably conflict with a WiFi protocol implementation. An example of a TDD scheme working principle is shown in FIG. 2. Specifically, FIG. 2 is a block diagram illustrating a first time period 202 allocated to only DL transmission/reception and a second time period 204 during which both UL and DL transmissions are allowed.

Figure 3:
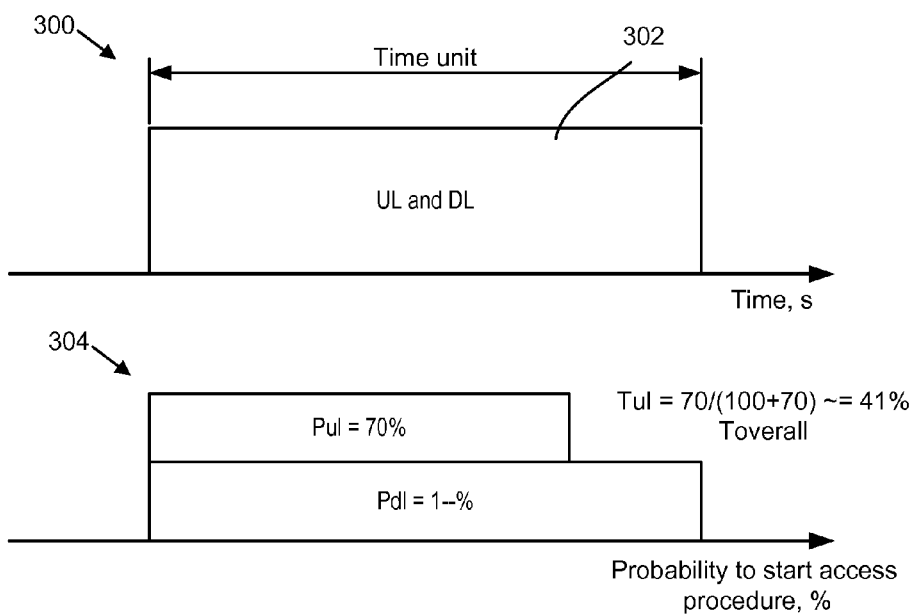
FIG. 3 is a schematic block diagram illustrating an example of a probabilistic sharing scheme.

In one embodiment, load balancing may be implemented using probabilistic sharing. This embodiment may allow for load balancing without modifying a WiFi standard. For example, in some embodiments, it may be undesirable or difficult to modify the MAC layer operation of current protocols. Thus, the UL/DL load balancing may be made on top of the MAC layer by dedicated control units (such as a unit that implements the MRCF), which may be present both on a UE 108 and a small cell 102. Probabilistic sharing includes assigning a probability to one or more of the UL or DL transmissions such that they may be transmitted at any time within the same time period but are limited based on the probability. Thus, UL or DL may be available during the same time period, but whether transmission in a UL direction occurs is based on an assigned probability. An example of probabilistic sharing is illustrated in FIG. 3. Specifically, FIG. 3 includes a first graphical diagram 300 with time block 302 in which both UL and DL communications can start access procedures, and a second graphical diagram 304 indicating that DL communications will be allowed to start access procedures with a probability of Pul, and UL communications will be scheduled with a probability of Pdl. In the specific example, Pul=70% and Pdl=100%, which leads to a DL throughput Tul of Tul=70/(100+70)≅41% of overall throughput Toverall.

In one embodiment, a probabilistic access principle with a pre-backoff delay is used where a UE is granted access to the channel with a certain probability P. Practically, this means that before initiating an actual WiFi MAC contention-based procedure, the UE (or AP) may determine, using a probability value, whether to contend for access. If the probability calculation indicates that the UE is not authorized, the UE defers entering contention for some additional pre-backoff period T (controlled by the given probability P), after which it will try or retry to access the channel. Comparing to the current WiFi behavior, some additional delay will be introduced to a certain percentage of users even before the contention procedure would start. This probability calculation may be performed at the UE or other device before starting a procedure to access the network to transmit a signal.

Figure 4A:
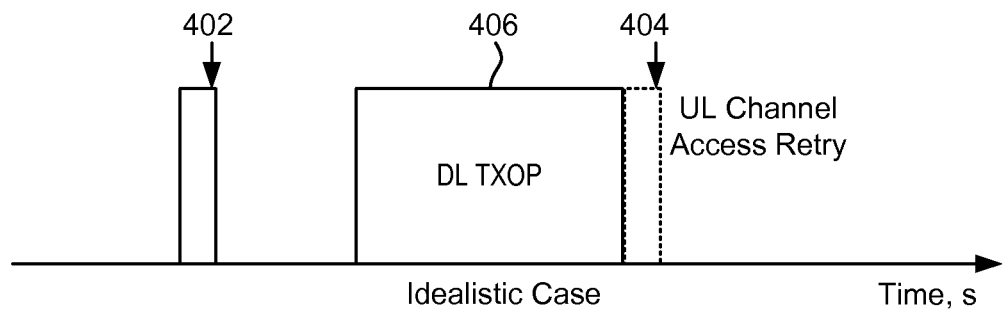
FIG. 4A is a schematic block diagram illustrating ideal timing for a retry to access a channel according to one embodiment.
Figure 4B:
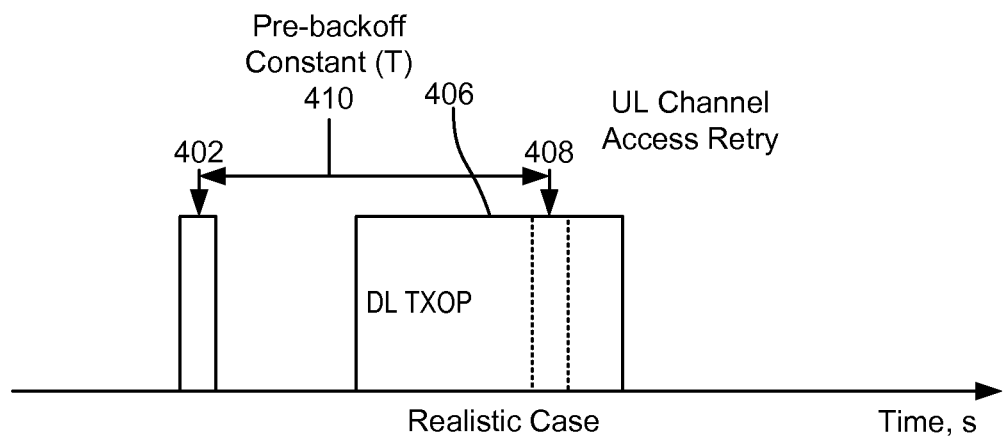
FIG. 4B is a schematic block diagram illustrating timing for a retry to access a channel based on a constant pre-backoff delay according to one embodiment.

The length of delay (i.e., the pre-backoff period T) before contending for access (or reevaluating the probability to see if the UE is authorized to contend) should match an amount of time when the next MAC layer transmission is supposed to end. FIG. 4A illustrates an example of ideal timing to retry accessing a channel after the probability calculation indicates that the device is not authorized. A first time 402 indicates the first attempt to access the channel (or calculate a probability to access the channel). A second time 404 indicates a timing of a second attempt that would follow right after an end of a previous DL transmission 406. However, practically speaking, this exact moment in time could be difficult to measure and may be even more difficult to report. Hence, in one embodiment, the pre-backoff period T has a constant value. If a constant value is used, there will be some attempts to access the channel that occur too early or may come too late. FIG. 4B illustrates an example situation where a UL channel access retry 408 occurs too early during a DL transmission 406. A pre-backoff period T 410 is illustrated. However, collisions and wasted time may be reduced by selecting an optimal value for T. While the optimal value of the pre-backoff period could depend on many factors, in simple cases T=max_TXOP, value should be a feasible choice (where max_TXOP is a maximum WiFi MAC transmission duration, given to a UE).

With the foregoing probabilistic access scheme with pre-backoff delay, consider one example scenario of UL/DL load balancing where the probability of UL UEs to transmit is Pul=20% while the DL access probability is Pdl=100%. It should be noted that Pul and Pdl may indicate the probability that the UE can begin an access procedure or may be a probability that the UE will be able to access the channel. In this case, for an efficient load control, the probability of an individual UL user n to transmit should be proportional to the overall number of UL users, e.g., Pul_n=Pul/N. In this case, the scheme proposed above would have direct control over effective UL channel throughput Tul such that Tul=T*Pul/(Pdl+Pul) (see FIG. 3), where T is the total channel throughput and Tul is the UL throughput. The DL throughput Tdl (as well as the MAC delay) will roughly remain constant and be equal to Tdl=T−Tul. Throughput and delay for such a system are shown in FIGS. 5A and 5B.

Figure 5A:
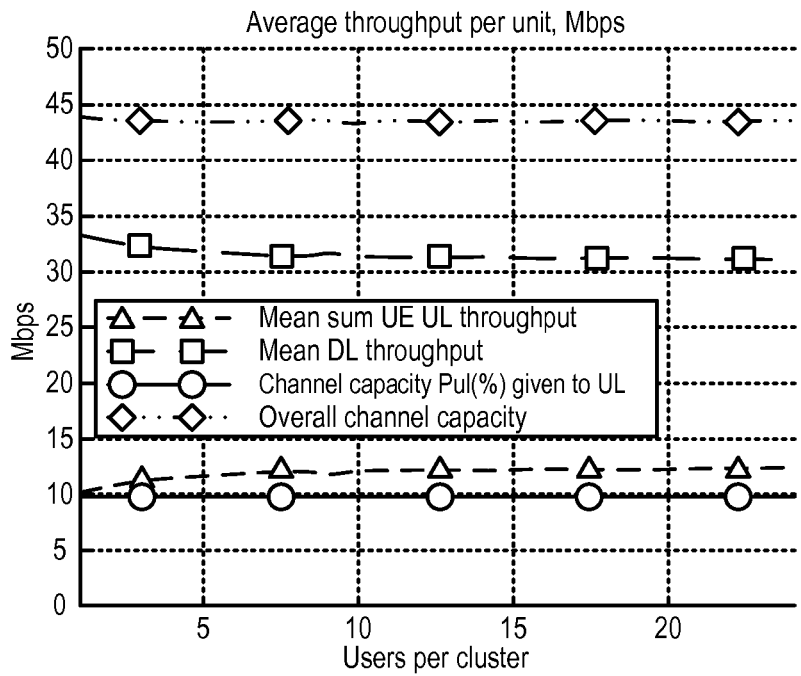
FIGS. 5A and 5B are graphical diagrams illustrating average throughput and average medium access control (MAC) delay for one example load control scenario.
Figure 5B:
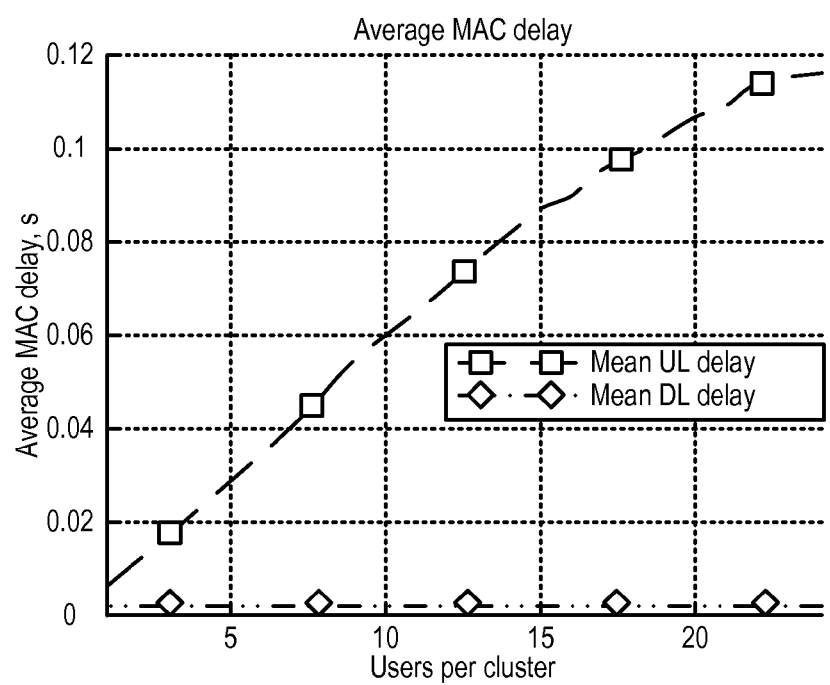

FIGS. 5A and 5B show a simple scenario with one AP and various number of users deployed in a small radius around the AP (users per cluster). From these graphs, it can be seen that delay and throughput of DL stays constant (targeted requirements satisfied), while Tul values are very close to the predicted ones. However, small inequality exists because realistic pre-backoff values discussed previously were used.

Figure 6A:
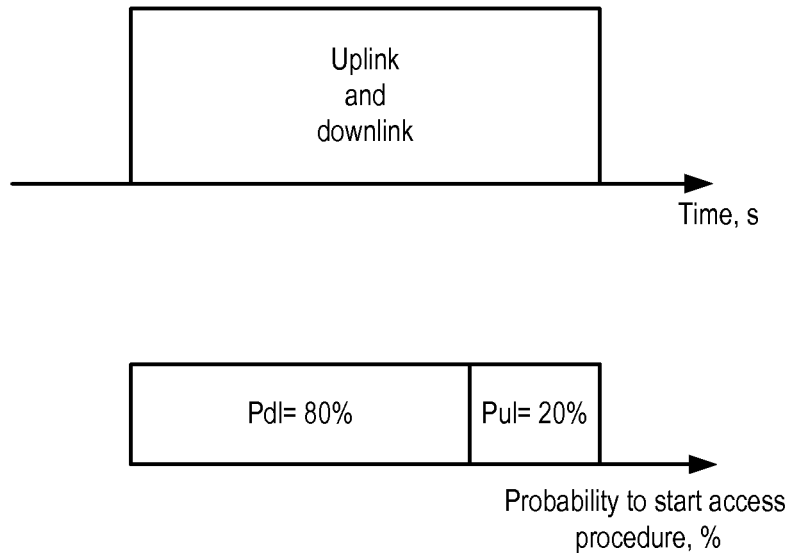
FIG. 6A is a schematic block diagram illustrating example access probabilities for a probabilistic access scheme.
Figure 6B:
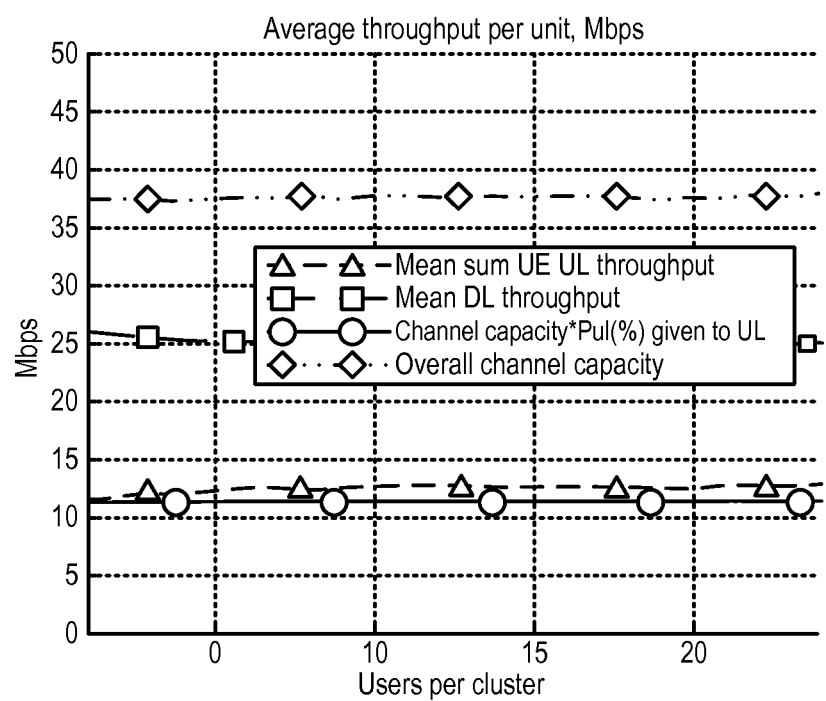
FIG. 6B is a graphical diagram illustrating average throughput based on the access probabilities of FIG. 6A.

In some embodiments, instead of Pdl=100%, it may be advantageous to limit UL and DL access probabilities such that Pul+Pdl=100%. That should give more flexibility to control the channel usage, e.g., Tul=T*Pul. It is also likely to yield smaller delays on the MAC layer due to lower contention probabilities. However, this generally decreases the available channel capacity and, particularly, its DL share Tdl. In FIGS. 6A and 6B, the concept is shown with a concrete numbers of Pul and Pdl, and the throughput results are shown. Specifically, FIG. 6A illustrates example values for Pdl and Pul and FIG. 6B illustrates average throughput per unit in Mbps. The throughput results were obtained with similar scenario parameters (as in FIGS. 5A and 5B). Furthermore, it can be seen that overall throughput decreases, but the difference between predicted and obtained values of Tul also decreases.

As mentioned, the pre-backoff probability (i.e., the UL/DL capacity) can be set based on long-term needs of the admitted traffic on each integrated small cell. Note that the RRC layer on the eNB 104 may have full knowledge of the radio bearers that will be supported by the small cell 102, and the WLAN capacity may be adjusted based on existing traffic demand. More generally, such probabilities may be captured through coordination in the network over the X2 interface, and the probabilities may be set to reduce the overall contention/interference in the network.

In one embodiment, the pre-backoff probabilities may be adapted based on dynamic overload detection. For different traffic types, the peak-to-average utilization of the link may be different, and some over-provisioning may occur in setting UL/DL capacity allocations. In the case when AP and UL users have, on average, low traffic demands, it may be feasible to fall back to the basic WiFi access scheme. However, in situations when UL and DL have longer periods of high/low intensity traffic switching, which is typical for real-life situations, UL/DL capacity may be allocated with probabilistic access and pre-backoff probabilities as discussed herein. Adjusting capacity, or switching between schemes, may require detecting when the overload on a certain transmission direction (UL/DL) occurs and enabling/disabling the load balancing scheme accordingly.

In one embodiment, overloads are detected using the binary exponential backoff (BEB) window size (or BEB stage) to indicate the average collision rate on the channel. For example, when the BEB window size is larger than some threshold value for a number of times in a sequence, the WiFi AP could report this to the respective control unit, e.g., an MRCF control unit. The control unit may then command (via, e.g., the LTE interface) the UE to decrease Pul. One drawback of this scheme may be that such tight coordination and information exchange may not be readily available for current WLAN AP/station (STA) implementations.

In some embodiments, systems and methods may be configured to adapt to interference conditions to improve performance of the probabilistic scheme. For example, based on the type or source of interference, the overall interference in the system could be classified as either network controlled or uncontrolled interference. Network controlled interference is created by the neighboring small cells, which are controlled by the network and are employing a same or similar UL/DL access scheme. One drawback of conventional WiFi is that the neighboring small cells working over the same channel actually belong to a single collision domain. This means that, in practice, the number of users participating in the MAC contention will be higher, and the actual probabilities to access the channel will depend on the sum of Pul across different cells. In that case, the cellular LTE network, which knows the collision domains of the nodes, may command the users in one collision domain to decrease their probabilities in order to satisfy the throughput requirements of a most/least loaded AP. Such coordination can occur over the X2 interface.

Figure 7A:
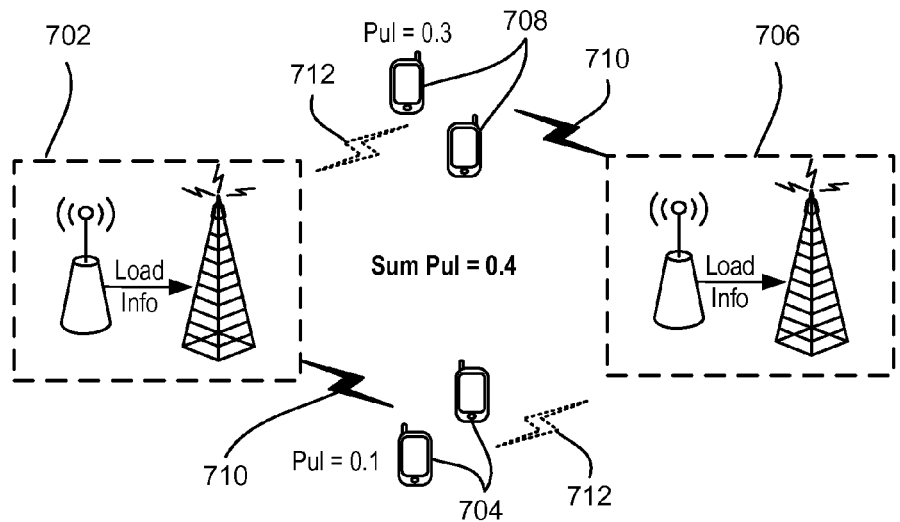
FIGS. 7A and 7B are schematic diagrams illustrating one embodiment of coordination between small cells to decrease access probabilities.
Figure 7B:
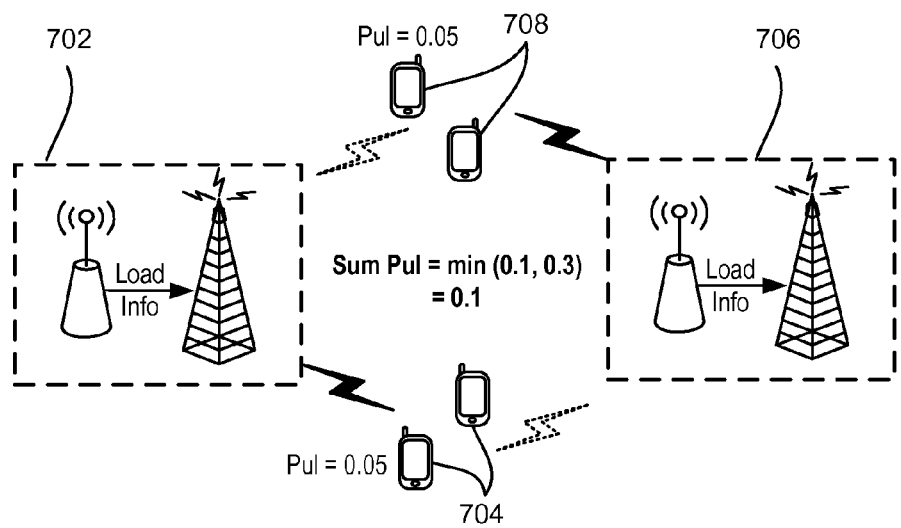

FIGS. 7A and 7B illustrate one embodiment of coordination between small cells to decrease probabilities. FIG. 7A illustrates a first small cell 702 communicating with one or more first UEs 704 in proximity of a second small cell 706 communicating with one or more second UEs 708. The signals 710 with solid lines indicate that the signals are meant for a specific small cell while the signals 712 with broken lines indicate interference. As illustrated, the first UEs 704 are using a Pul value of Pul=0.1, while the second UEs 708 are using a Pul value of Pul=0.3. Because the first UEs 704 and the second UEs 708 are part of the same collision domain, this leads to an effective overall sum Pul of Pul=0.4 In one embodiment, this Pul value may be higher than desired. Thus, the neighboring small cells 702, 706 may coordinate with each other to agree on a sum Pul value. For example, the small cells 702, 706 may report their throughput requirements. For example, the first small cell 702 may indicate that its overall Pul value should be at most 0.1, and the second small cell 706 may indicate that its overall Pul value should be at most 0.4. FIG. 7B illustrates that the sum Pul value was agreed to be sum Pul=min(0.1, 0.3)=0.1. The updated Pul values are communicated to the UEs 704, 708 in control messages. Thus, both the first UEs 704 and the second UEs 708 are assigned P values of 0.05 or less, as shown.

In uncontrolled interference, on the other hand, interference is created by WiFi "rogue" nodes (notes that are not controlled or only partially controlled by the 3GPP network), which may not have support for probabilistic access (e.g., do not support any UL/DL control on WiFi as proposed herein). This kind of interference may not be controlled. Thus, significant degradation of overall in-network WLAN capacity may occur in the presence of rogue WLAN interference. In one embodiment, a system may adapt the probabilistic scheme in the presence of rogue WLAN interference. For example, some traffic may be moved to a 3GPP link. However, although in-network contention can be managed to some desired target level through cooperation over the 3GPP links of the integrated multi-RAT network (as discussed above), the rogue interference cannot be managed and must be detected and addressed separately.

Figure 8A:
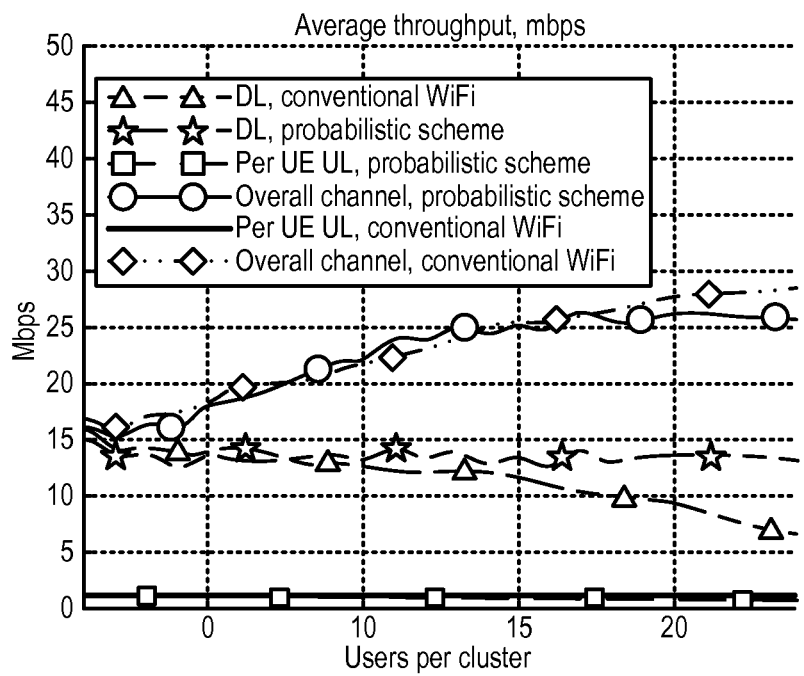
FIGS. 8A and 8B are graphical diagrams illustrating throughput in the presence of rogue interference according to one embodiment.
Figure 8B:
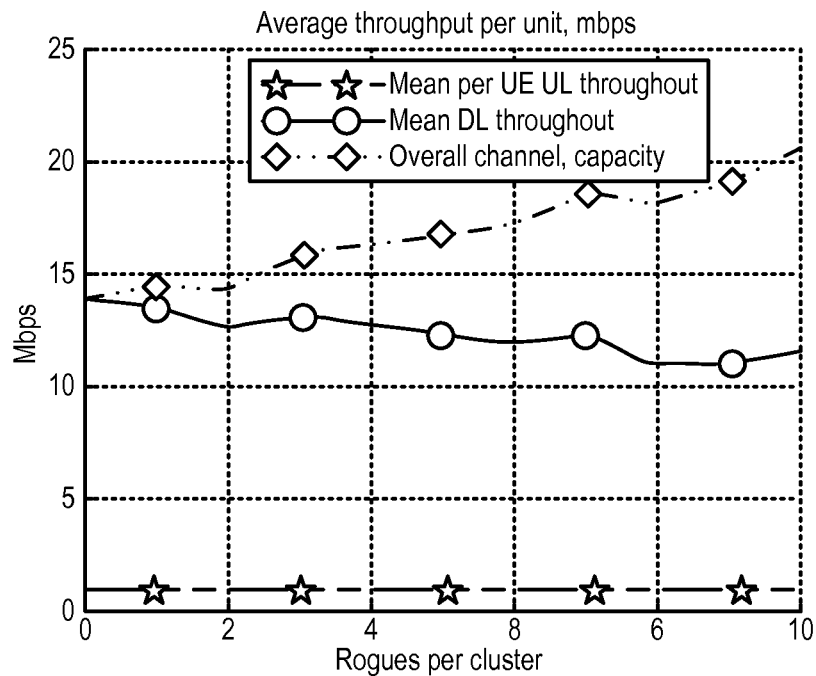
Figure 9:
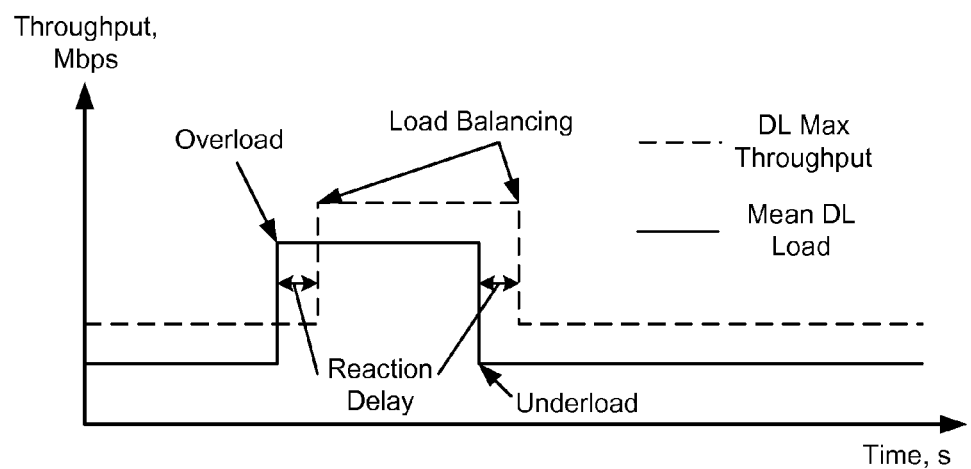
FIG. 9 is a graphical diagram illustrating one embodiment of automatic load balancing.

In one embodiment, a system may use the probabilistic scheme in conjunction with overload detection and control mechanisms to detect when contention within the WLAN network exceeds the target configured levels. If the desired capacity is underutilized due to intermittent traffic on the desired link, then the excess capacity used by the rogue interference is unlikely to degrade performance. This is shown in FIGS. 8A and 8B, where both the desired and rogue interfering link transmit non-full buffer traffic (such as file transfer protocol (ftp) traffic), but there is no overload situation. If the rogue interference causes an overload condition beyond the target configured system capacity, the system needs to detect overload conditions. For example, the load peaks could be detected where the packets arrive in bursts, creating periods of high and low loads on the DL transmission. An approximate graphical model of a system with automatic load balancing is shown in FIG. 9.

In situations where overload is detected, the overload may be mitigated by offloading some of the traffic (or some of the UEs) to the LTE link. For example, the overload can be mitigated by moving some flows to the LTE network or throttling (or reducing throughput for) some users. If the minimum bitrate requirement Tmin is set for UL or DL users, and the estimated channel capacity (based on Pul/Pdl and T) is smaller than Tmin, the user or the network may prefer to switch to the cellular network, rather than reducing the throughput.

Figure 10:
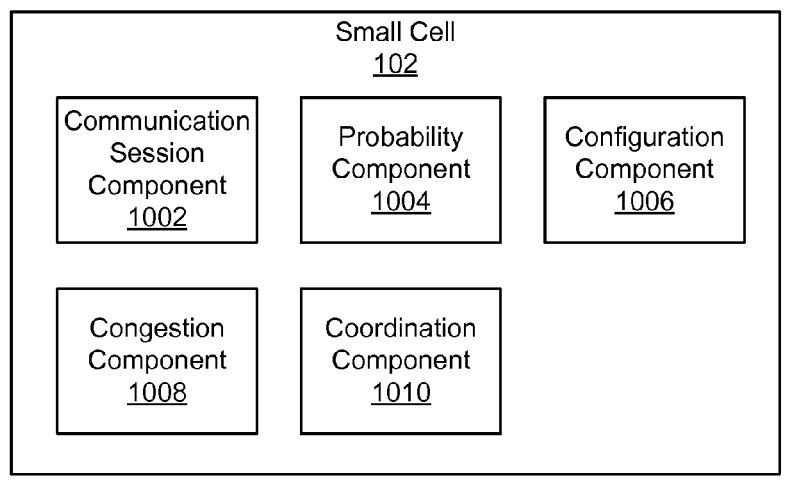
FIG. 10 is a schematic block diagram illustrating components of a small cell, according to one embodiment.

FIG. 10 is a schematic block diagram of a small cell 102 illustrating some components for controlling a UL/DL load. Some components of the small cell 102 are not shown to avoid obscuring the disclosure. The small cell 102 includes a communication session component 1002, a probability component 1004, a configuration component 1006, a congestion component 1008, and a coordination component 1010. The components 1002-1010 are given by way of example only and may not all be included in all embodiments. Each of the components 1002-1010 may be included in or may be implemented by one or more of an eNB, MRCF control unit, and WLAN AP. In one embodiment, the small cell 102 is configured to determine and configure a probabilistic access scheme for one or more UEs or APs.

The communication session component 1002 is configured to establish and/or maintain a communication session with one or more UEs. In one embodiment, the communication session component 1002 may establish a communication session with a UE over two or more RATs. For example, the communication session component 1002 may establish a communication session with a UE over a 3GPP link and a non-3GPP link, such as WiFi.

The probability component 1004 is configured to determine a maximum pre-backoff probability for the UE to communicate with a non-3GPP AP. In one embodiment, the maximum pre-backoff probability indicates a maximum probability at which the UE is allowed to transmit data in an uplink (UL) direction to the non-3GPP AP. For example, the probability component 1004 may determine a Pul value according to any of the teaching provided in the present disclosure. In one embodiment, the probability component 1004 may also determine a maximum pre-backoff probability for a DL direction. In one embodiment, the probability component 1004 determines a pre-backoff probability for each UE in communication with the small cell 102. In one embodiment, the probability component 1004 determines the pre-backoff probability based on communication needs or traffic flows of each UE.

The configuration component 1006 is configured to provide one or more details of a UL/DL load control scheme to one or more UEs. For example, the configuration component 1006 may provide a UL pre-backoff probability value, a DL pre-backoff probability value, a length of a pre-backoff period, or the like to one or more connected UEs. In one embodiment, the configuration component 1006 sends an RRC message indicating the maximum pre-backoff probability for the UE. The pre-backoff probability may be used by the UE to determine whether the UE should delay contention for transmission for at least a pre-backoff duration (pre-backoff period) based on the maximum pre-backoff probability.

In one embodiment, the configuration component 1006 may send one or more additional maximum pre-backoff probabilities to one or more additional UEs. The maximum pre-backoff probability of one UE may or may not have a value different from the maximum pre-backoff probability of another UE. In one embodiment, the configuration component 1006 is configured to set the pre-backoff duration based on a current load on the non-3GPP network (e.g., a WLAN). In one embodiment, the configuration component may provide a maximum UL pre-backoff probability and a maximum DL pre-backoff probability to a single UE. In one embodiment, the sum of the maximum DL pre-backoff probability and the maximum UL pre-backoff probability corresponds to 100%.

The congestion component 1008 is configured to detect congestion or overload on the WLAN or other non-3GPP network. In one embodiment, the congestion component 1008 may detect congestion or overload on any network that is used as a virtual carrier for a cellular network. For example, the congestion component 1008 may detect overload as depicted in FIG. 9. In one embodiment, the congestion component 1008 detects the congestion or overload based on a BEB window size exceeding a threshold value.

In one embodiment, the congestion component 1008 is further configured to receive the BEB window size from the virtual carrier network, such as from the WLAN AP in FIG. 1. In one embodiment, the congestion component 1008 is configured to move traffic from the non-3GPP AP (such as a WLAN AP) to the 3GPP network (e.g., the eNB and corresponding licensed frequency band) in response to detecting the congestion. In one embodiment, congestion component 1008 is configured to determine whether any interference is caused by a neighboring cell or by rogue (uncontrolled) devices.

The coordination component 1010 is configured to coordinate with another small cell to determine pre-backoff probabilities. For example, the other small cell may be in proximity such that WLAN APs of the proximal small cells are part of the same WLAN collision domain. In one embodiment, the coordination component 1010 allows the small cell 102 to coordinate with the neighboring cell to reduce traffic in a collision domain of the eNB 104. In one embodiment, the coordination component 1010 exchanges WLAN usage and resource requirements with the small cell 102. In one embodiment, the probability component 1004 is configured to determine maximum pre-backoff probabilities based on the exchanged WLAN usage and resource requirements.

Figure 11:
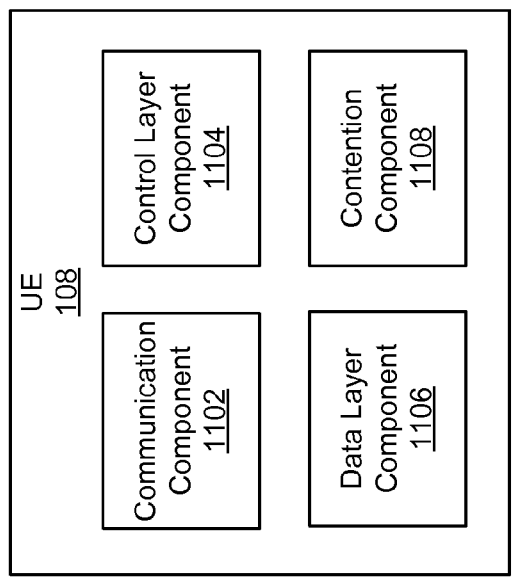
FIG. 11 is a schematic block diagram illustrating components of a user equipment (UE), according to one embodiment.

FIG. 11 is a schematic block diagram of a UE 108 illustrating some components for controlling a UL/DL load. Some components of the UE 108 are not shown to avoid obscuring the disclosure. The UE 108 includes a communication component 1102, a control layer component 1104, a data layer component 1106, and a contention component 1108. The components 1102-1108 are given by way of example only and may not all be included in all embodiments. In one embodiment, the UE 108 is configured to access a WLAN channel based on a probabilistic access scheme. Each of the components 1102-1108 may be included in or may be implemented by one or more of the UE 108, an MRCF control unit, or other standardized or non-standardized component of the UE 108.

The communication component 1102 is configured to communicate with a small cell 102 using two different RATs. For example, the communication component may allow the UE 108 to communicate, or establish communication sessions, with the small cell 102 over a licensed wireless spectrum and an unlicensed wireless spectrum. In one embodiment, the communication component 1102 sends or receives at least a portion of control layer data over the licensed wireless spectrum and at least a portion of user layer data over the unlicensed spectrum. In one embodiment, the small cell 102 may include an eNB and WLAN AP. The communication component 1102 may receive control data from the eNB to control communication flows on the WLAN. In one embodiment, the communication component 1102 may determine whether there is a queued transmission for the UE. For example, the communication component 1102 may determine whether an application or other service on the UE 108 has a UL communication to transmit.

The control layer component 1104 is configured to receive control layer communications from the small cell 102. In one embodiment, the control layer component 1104 is configured to receive, on a licensed spectrum, contention settings for communicating using an unlicensed spectrum. For example, the control layer component 1104 may receive one or more RRC messages configuration operation on a WiFi link. The contention settings may indicate a probability of communicating in a UL direction over the unlicensed spectrum. For example, the control layer component 1104 may receive a maximum probability of accessing a WLAN for communication via a 3GPP communication link with an eNB. In one embodiment, the control layer component 1104 may receive updates for the UL probability. For example, the control layer component 1104 may receive an updated maximum probability. In one embodiment, the control layer component 1104 may receive contention settings that include a probability of communicating in a DL direction over an unlicensed spectrum, such as a WLAN.

The data layer component 1106 manages communications on a virtual carrier RAT based on the contention settings. For example, the virtual carrier RAT may include a WLAN RAT such as WiFi, or another RAT different from a RAT used to communicate the control layer communications. For example, the control layer communications may be received by the control layer component 1104 via a 3GPP communication link, and one or more data flows may be communicated via a WLAN communication link.

In one embodiment, the data layer component 1106 determines whether the UE is authorized to transmit in a UL direction. For example, in response to determining that there is a queued transmission, the data layer component 1106 may determine whether the UE is authorized to access the WLAN. The data layer component 1106 may determine whether the UE is authorized to access the network using a probability less than or equal to the probability received from the small cell 102, such as the probability received by the control layer component 1104. In one embodiment, the data layer component 1106 uses a random number generator or other random algorithm to see if the UE 108 is authorized to transmit. If the data layer component 1106 determines that the UE 108 is authorized to transmit, the UE 108 may begin an access procedure to access the WLAN or other network.

If the data layer component 1106 determines that the UE 108 is not authorized, the data layer component 1106 may wait for a pre-backoff period before trying an additional time to access the channel. For example, the data layer component 1106 may evaluate the probability once more to see if the UE 108 is now authorized to access. The probability evaluated by the data layer component 1106 may be described as a pre-backoff probability in that it is the probability of a UL transmission (or other transmission) being delayed. The pre-backoff period or duration, as discussed above, may be selected to optimize usage of the channel. For example, the pre-backoff period may be a constant value that allows the data layer component 1106 to retry after a previous transmission has ended. In one embodiment, the pre-backoff period is a time period corresponding to a maximum MAC transmission duration on the WLAN.

In one embodiment, the data layer component 1106 may determine a pre-backoff probability based on a maximum probability received from a small cell 102. For example, the probability received from the small cell 102 may be treated as a maximum probability while allowing the UE 108 to select a lower probability. In one embodiment, the data layer component 1106 determines the lower probability based on one or more of congestion on the WLAN, a QoS requirement of a data stream, and current communication needs of one or more applications on the UE 108. For example, the UE 108 may determine that the WLAN is congested, so it may reduce the probability if it is communicating data that has a low QoS, such as web browsing. Similarly, if the data layer component 1106 determines that applications on the UE 108 have low data requirements or needs, the data layer component 1106 may independently select a lower probability to reduce load on the network. In one embodiment, the data layer component 1106 may use the updated or modified probability to determine whether the UE 108 is authorized to access a channel.

The contention component 1108 is configured to contend for access to a WLAN or other RAT used as a virtual carrier. In one embodiment, the data layer component 1106 may include the contention component 1108. For example, the contention component 1108 may contend for access in response to the data layer component 1106 determining that the UE 108 is authorized to access the WLAN. In one embodiment, the contention component 1108 may contend for UL or DL communication during any time period. For example, the contention component 1108 may contend for access during a shared time period where either DL or UL communications may be sent.

Figure 12:
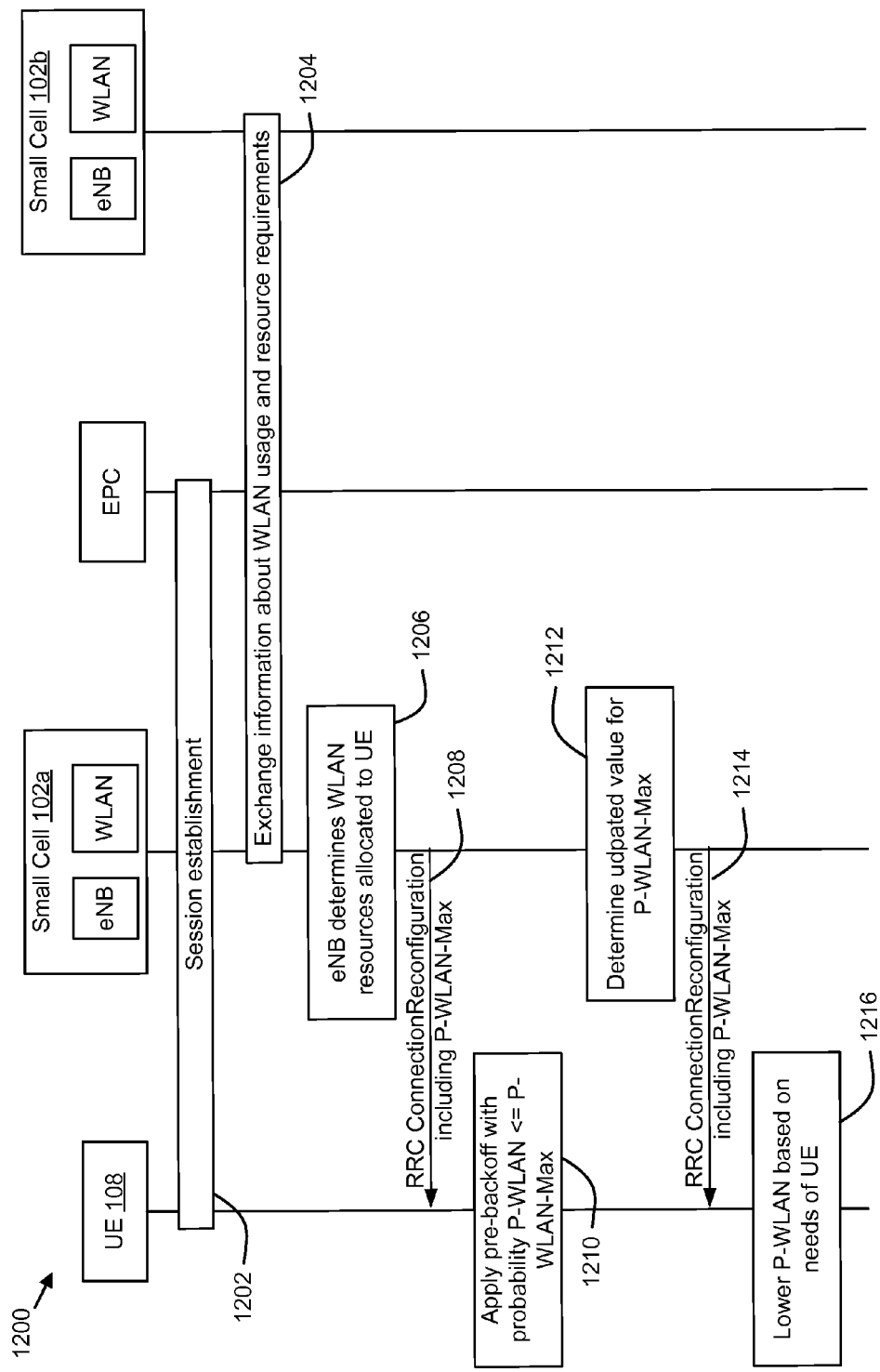
FIG. 12 is a schematic flow chart diagram illustrating a method for load balancing according to one embodiment.

FIG. 12 is a schematic flow chart diagram illustrating an example method 1200 for configuration and operation of a UL/DL load balancing scheme. The method 1200 involves a UE 108, first and second small cells 102a, 102b, and an EPC.

The method 1200 begins and a communication session is established at 1202. In one embodiment, the UE 108 communicates with the small cell 102a to establish the communication session. In one embodiment, the small cell 102a corresponds with the EPC to establish one or more bearers. In one embodiment, the communication session may include a communication link using a first RAT and a different communication link using a second RAT. For example, the communication session may include a link with an eNB and a link with a WLAN AP.

At 1204, the small cells 102a and 102b exchange information about WLAN usage and resource requirements. For example, small cell 102a and small cell 102b may include WLAN APs that are within the same collision domain. In one embodiment, the exchange of WLAN usage information, throughput requirements, and the like, occurs on a periodic basis even after a UL or DL probability has been configured.

At 1206, the eNB of the small cell 102a determines WLAN resources allocated to the UE 108. For example, the eNB may have a knowledge of the communication requirements, including QoS, of data flows on the UE 108. Based on this knowledge, as well as the number of connected UEs, WLAN usage of the other small cell 102b, and/or other information, the eNB determines what portion of WLAN resources to allocate to the UE 108. The resource allocation may include a limit on one or more of UL and DL communications.

At 1208, the small cell 102a sends, via the eNB, an RRC ConnectionReconfiguration message to the UE 108 that includes a maximum access probability P-WLAN-Max. In one embodiment, the P-WLAN-Max may include one or more of a UL probability and a DL probability. At 1210, the UE 108 applies pre-backoff delay on WLAN communications based on a pre-backoff probability P-WLAN, where P-WLAN is less than or equal to P-WLAN-Max. For example, the UE 108 may delay, with probability P-WLAN, each UL transmission for at least a pre-backoff period.

At 1212, the eNB determines an updated value for P-WLAN-Max. For example, the updated value for P-WLAN-Max may reflect changes in the number of connected UEs, interference, or a load on the neighboring small cell 102b. At 1214, the eNB sends the updated P-WLAN-Max as part of an RRC ConnectionReconfiguration message.

At 1216, the UE 108 may lower or otherwise adjust the P-WLAN value independently from the small cell 102a, as long as the P-WLAN value is less than P-WLAN-Max. For example, the UE 108 may accommodate changing communication requirements. For example, the UE 108 may locally lower P-WLAN based on congestion or QoS needs of applications on the UE 108.

Figure 13:
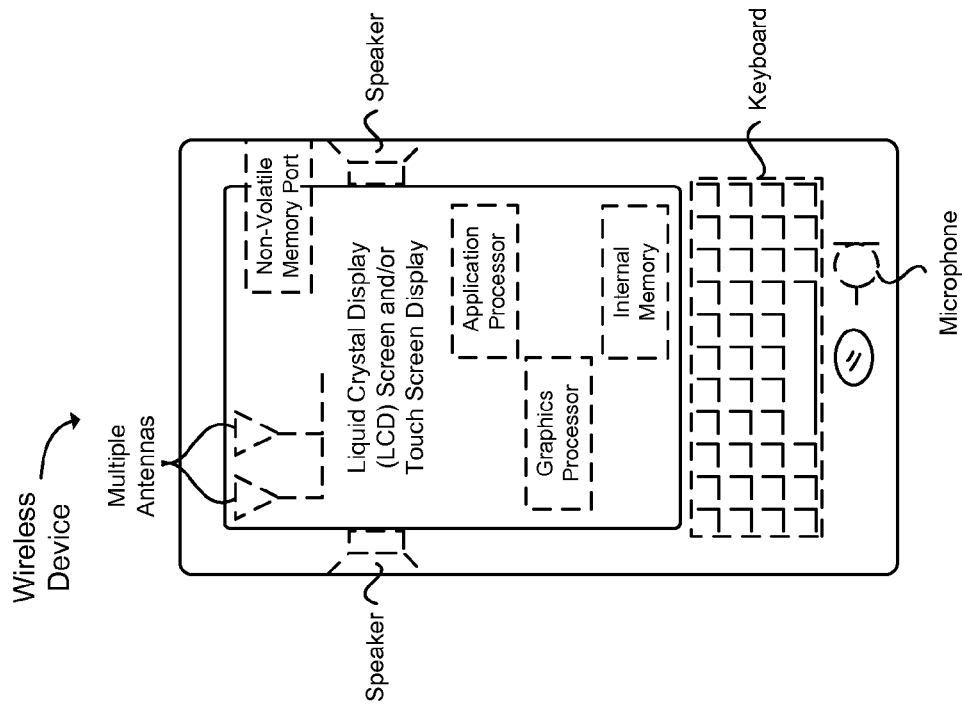
FIG. 13 illustrates a diagram of a wireless device (e.g., UE) in accordance with an example.

FIG. 13 provides an example illustration of a mobile device, such as a UE, a mobile station (MS), a mobile wireless device, a mobile communication device, a tablet, a handset, or another type of mobile wireless device. The mobile device may include one or more antennas configured to communicate with a node, macro node, low power node (LPN), or transmission station, such as a base station (BS), an eNB, a base band unit (BBU), a remote radio head (RRH), a remote radio equipment (RRE), a relay station (RS), a radio equipment (RE), or another type of wireless wide area network (WWAN) AP. The mobile device may be configured to communicate using at least one wireless communication standard, including 3GPP LTE, WiMAX, High Speed Packet Access (HSPA), Bluetooth, and WiFi. The mobile device may communicate using separate antennas for each wireless communication standard or shared antennas for multiple wireless communication standards. The mobile device may communicate in a WLAN, a wireless personal area network (WPAN), and/or a WWAN.

FIG. 13 also provides an illustration of a microphone and one or more speakers that may be used for audio input and output from the mobile device. The display screen may be a liquid crystal display (LCD) screen or other type of display screen, such as an organic light emitting diode (OLED) display. The display screen may be configured as a touch screen. The touch screen may use capacitive, resistive, or another type of touch screen technology. An application processor and a graphics processor may be coupled to internal memory to provide processing and display capabilities. A non-volatile memory port may also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.

Example 1 is a UE configured to receive a maximum probability of accessing a WLAN for communication. The maximum probability is received via a 3GPP communication link with an eNB. The UE is configured to determine that there is a queued transmission for the UE. In response to determining that there is a queued transmission, the UE is configured to determine whether the UE is authorized to access to the WLAN using a probability less than or equal to the maximum probability and delay contention for access to the WLAN for at least a pre-backoff duration in response to determining that the UE is not authorized.

In Example 2, the UE of Example 1 is further configured to receive an updated maximum probability and wherein determining whether the UE is authorized to access the WLAN includes determining based on the updated maximum probability.

In Example 3, the pre-backoff duration of any of Examples 1-2 includes a time period corresponding to a MAC transmission duration on the WLAN.

In Example 4, the UE of any of Examples 1-3 is further configured to determine whether the UE is authorized to access the WLAN an additional time at the end of the pre-backoff duration.

In Example 5, the UE of any of Examples 1-4 is configured to contend for access to the WLAN in response to determining that the UE is authorized.

In Example 6, the WLAN of any of Examples 1-5 includes a wireless access point and the UE is further configured to establish a communication session with a small cell comprising the eNB and the wireless access point.

In Example 7, the UE of any of Examples 1-6 is further configured to determine the probability based on one or more of congestion on the WLAN, a quality-of-service requirement of a data stream, and current communication needs of one or more applications on the UE. The probability is less than or equal to the maximum probability.

Example 8 is a wireless communication device that includes a communication component, a control layer component, and a data layer component. The communication component is configured to communicate with a small cell over a licensed wireless spectrum and an unlicensed wireless spectrum. Communicating with the small cell includes communicating at least a portion of control layer data over the licensed wireless spectrum and communicating at least a portion of user layer data over the unlicensed spectrum. The control layer component is configured to receive, on the licensed spectrum, contention settings for communicating using the unlicensed spectrum. The contention settings includes a probability of communicating in an UL direction over the unlicensed spectrum. The data layer component is configured to manage communications on the unlicensed spectrum based on the contention settings.

In Example 9, the data layer component of Example 8 is configured to determine whether the wireless communication device is authorized to contend for UL access to the unlicensed spectrum based on the probability.

In Example 10, the data layer component of Example 9 is further configured to determine whether the wireless communication device is authorized an additional time after waiting a pre-backoff duration in response to determining that the wireless communication device is not authorized to contend for UL access.

In Example 11, the data layer component of any of Examples 9-10 is further configured to contend for UL access in response to determining that the wireless communication device is authorized to contend for UL access.

In Example 12, the control layer component of any of Examples 8-11 is further configured to receive, over the licensed spectrum, contention settings comprising a probability of communicating in a DL direction over the unlicensed spectrum.

In Example 13, the data layer component of any of Examples 8-12 is configured to contend for access for UL and DL communication based on probabilistic access during a shared time period.

Example 14 is an eNB that includes a communication session component, a probability component, and a configuration component. The communication session component is configured to establish a communication session with a UE over a 3GPP link. The probability component is configured to determine a maximum pre-backoff probability for the UE to communicate with a non-3GPP access point. The maximum pre-backoff probability indicates a maximum probability at which the UE is allowed to transmit data in an UL direction to the non-3GPP access point. The configuration component is configured to send a RRC message indicating the maximum pre-backoff probability for the UE. The UE is configured to determine whether the UE should delay contention for transmission for at least a pre-backoff duration based on the maximum pre-backoff probability.

In Example 15, the maximum pre-backoff probability of Example 14 includes a first maximum pre-backoff probability. The communication session component is further configured to establish additional communication sessions with one or more additional UEs and the configuration component is configured to send additional RRC messages including one or more additional maximum pre-backoff probabilities for the one or more additional UEs.

In Example 16, the one or more additional maximum pre-backoff probabilities of Example 15 include a probability different from the maximum pre-backoff probability.

In Example 17, the configuration component of any of Examples 14-16 is configured to set the pre-backoff duration based on a load on the non-3GPP network.

In Example 18, the eNB of any of Examples 14-17 further includes a congestion component configured to detect congestion on a network corresponding to the non-3GPP access point.

In Example 19, the congestion component of any of Examples 14-18 is configured to detect the congestion based on a BEB window size exceeding a threshold value.

In Example 20, the congestion component of any of Examples 14-19 is configured to move traffic from the non-3GPP access point to the 3GPP network in response to the congestion component detecting the congestion.

In Example 21, the congestion component of any of Examples 14-20 is configured to determine whether any interference is caused by a neighboring cell. The eNB further includes a coordination component configured to coordinate with the neighboring cell to reduce traffic in a collision domain of the eNB.

Example 22 is a method for contention management. The method includes receiving, at UE, a maximum probability of accessing a WLAN for communication. The maximum probability is received via a 3GPP communication link with an eNB. The method includes determining that there is a queued transmission for the UE. The method includes, in response to determining that there is a queued transmission, determining whether the UE is authorized to access to the WLAN using a probability less than or equal to the maximum probability. The method includes delaying contention for access to the WLAN for at least a pre-backoff duration in response to determining that the UE is not authorized.

In Example 23, the method of Example 22 further comprises receiving an updated maximum probability and wherein determining whether the UE is authorized to access the WLAN comprises determining based on the updated maximum probability.

In Example 24, the pre-backoff duration of any of Examples 22-23 includes a time period corresponding to a maximum MAC transmission duration on the WLAN.

In Example 25, the method of any of Examples 22-24 further includes determining whether the UE is authorized to access the WLAN an additional time at the end of the pre-backoff duration.

In Example 26, the method of any of Examples 22-25 further includes contending for access to the WLAN in response to determining that the UE is authorized.

In Example 27, the WLAN of any of Examples 22-26 includes a wireless access point and the method further comprises establishing a communication session with a small cell comprising the eNB and the wireless access point.

In Example 28, the method of any of Examples 22-27 further includes determining the probability based on one or more of congestion on the WLAN, a quality-of-service requirement of a data stream, and current communication needs of one or more applications on the UE, wherein the probability is less than or equal to the maximum probability.

Example 29 is a method for contention management that includes communicating, using a wireless communication device, with a small cell over a licensed wireless spectrum and an unlicensed wireless spectrum. Communicating with the small cell includes communicating at least a portion of control layer data over the licensed wireless spectrum and communicating at least a portion of user layer data over the unlicensed spectrum. The method includes receiving, on the licensed spectrum, contention settings for communicating using the unlicensed spectrum, wherein the contention settings comprise a probability of communicating in an UL direction over the unlicensed spectrum. The method includes managing communications at the wireless communication device on the unlicensed spectrum based on the contention settings.

In Example 30, the method of Example 29 further includes determining whether the wireless communication device is authorized to contend for UL access to the unlicensed spectrum based on the probability.

In Example 31, the method of any of Examples 29-30 further includes determining whether the wireless communication device is authorized an additional time after waiting a pre-backoff duration in response to determining that the wireless communication device is not authorized to contend for UL access.

In Example 32, the method of any of Examples 29-31 further includes contending for UL access in response to determining that the wireless communication device is authorized to contend for UL access.

In Example 33, the method of any of Examples 29-32 further includes receiving, over the licensed spectrum, contention settings comprising a probability of communicating in a DL direction over the unlicensed spectrum.

In Example 34, the method of any of Examples 29-33 further includes contending for access for UL and DL communication based on probabilistic access during a shared time period.

Example 35 is a method for contention management that includes establishing, at an eNB, a communication session with a UE over a 3GPP link. The method includes determining a maximum pre-backoff probability for the UE to communicate with a non-3GPP access point, wherein the maximum pre-backoff probability indicates a maximum probability at which the UE is allowed to transmit data in an UL direction to the non-3GPP access point. The method includes sending a RRC message indicating the maximum pre-backoff probability for the UE, wherein the UE is configured to determine whether the UE should delay contention for transmission for at least a pre-backoff duration based on the maximum pre-backoff probability.

In Example 36, the maximum pre-backoff probability of Example 35 includes a first maximum pre-backoff probability. The method further includes establishing additional communication sessions with one or more additional UEs and sending additional RRC messages comprising one or more additional maximum pre-backoff probabilities for the one or more additional UEs.

In Example 37, the one or more additional maximum pre-backoff probabilities of Example 36 include a probability different from the maximum pre-backoff probability.

In Example 38, the method of any of Examples 35-37 further includes setting the pre-backoff duration based on a load on the non-3GPP network.

In Example 39, the method of any of Examples 35-38 further includes detecting congestion on a network corresponding to the non-3GPP access point.

In Example 40, detecting congestion in any of Examples 35-39 includes detecting the congestion based on a BEB window size exceeding a threshold value.

In Example 41, the method of any of Examples 35-40 further includes moving traffic from the non-3GPP access point to the 3GPP network in response to the congestion component detecting the congestion.

In Example 42, the method of any of Examples 35-41 further includes determining whether any interference is caused by a neighboring cell and coordinating with the neighboring cell to reduce traffic in a collision domain of the eNB.

Example 43 is an apparatus that includes means to perform a method of any of Examples 22-42.

Example 44 is a machine readable storage including machine-readable instructions, when executed, to implement a method or realize an apparatus of any of Examples 22-43.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

The invention claimed is:

1. A user equipment (UE) configured to:
receive a maximum access probability that the UE will be able to access a wireless local area network (WLAN) for communication, wherein the maximum access probability is a value received via a 3rd Generation Partnership Project (3GPP) communication link with an Evolved Universal Terrestrial Radio Access Network (E-UTRAN) Node B (eNB);
determine that there is a queued transmission for the UE;
in response to determining that there is a queued transmission, determine whether the UE is authorized to access the WLAN using a probability less than or equal to the maximum access probability; and
delay contention for access to the WLAN for at least a pre-backoff duration in response to determining that the UE is not authorized to access the WLAN using the probability less than or equal to the maximum access probability.

2. The UE of claim 1, wherein the UE is further configured to receive an updated maximum access probability and wherein determining whether the UE is authorized to access the WLAN comprises determining based on the updated maximum access probability.

3. The UE of claim 1, wherein the pre-backoff duration comprises a time period corresponding to a maximum medium access control (MAC) transmission duration on the WLAN.

4. The UE of claim 1, wherein the UE is further configured to determine whether the UE is authorized to access the WLAN an additional time at the end of the pre-backoff duration.

5. The UE of claim 1, wherein the UE is configured to contend for access to the WLAN in response to determining that the UE is authorized.

6. The UE of claim 1, wherein the WLAN comprises a wireless access point and wherein the UE is further configured to establish a communication session with a small cell comprising the eNB and the wireless access point.

7. The UE of claim 1, wherein the UE is further configured to determine the probability based on one or more of congestion on the WLAN, a quality-of-service requirement of a data stream, and current communication needs of one or more applications on the UE, wherein the probability is less than or equal to the maximum access probability.

8. A wireless communication device comprising:
communication circuitry configured to communicate with a small cell over a licensed wireless spectrum and an unlicensed wireless spectrum, wherein communicating with the small cell comprises communicating at least a portion of control layer data over the licensed wireless spectrum and communicating at least a portion of user layer data over the unlicensed spectrum;
control layer circuitry configured to receive, on the licensed spectrum, contention settings for communicating using the unlicensed spectrum, wherein the contention settings comprise an access probability of the wireless communication device beginning an access procedure for uplink (UL) communication over the unlicensed spectrum;
wherein the control layer circuitry is further configured to receive, over the licensed spectrum, additional contention settings comprising a probability of communicating in a downlink (DL) direction over the unlicensed spectrum; and
data layer circuitry configured to manage communications on the unlicensed spectrum based on the contention settings.

9. The wireless communication device of claim 8, wherein the data layer circuitry is configured to determine whether the wireless communication device is authorized to contend for UL access to the unlicensed spectrum based on the access probability.

10. The wireless communication device of claim 9, wherein, in response to determining that the wireless communication device is not authorized to contend for UL access, the data layer circuitry is further configured to determine whether the wireless communication device is authorized an additional time after waiting a pre-backoff duration.

11. The wireless communication device of claim 9, wherein, in response to determining that the wireless communication device is authorized to contend for UL access, the data layer circuitry is further configured to contend for UL access.

12. The wireless communication device of claim 8, wherein the data layer circuitry is configured to contend for access for UL communication based on probabilistic access during a shared time period during which the wireless communication device is permitted to perform either UL or DL communications.

13. An Evolved Universal Terrestrial Radio Access Network (E-UTRAN) Node B (eNB) comprising:
communication session circuitry configured to establish a communication session with a user equipment (UE) over a 3rd Generation Partnership Project (3GPP) link;
probability circuitry configured to determine a maximum pre-backoff probability for the UE to communicate with a non-3GPP access point, wherein the maximum pre-backoff probability indicates a maximum probability at which the UE is allowed to transmit data in an uplink (UL) direction to the non-3GPP access point;
configuration circuitry configured to send a radio resource control (RRC) message indicating the maximum pre-backoff probability for the UE, wherein the RRC message indicates whether the UE should delay contention for transmission for at least a pre-backoff duration based on the maximum pre-backoff probability; and
congestion circuitry configured to detect congestion on a network corresponding to the non-3GPP access point, wherein the congestion circuitry is configured to detect the congestion based on a binary exponential backoff (BEB) window size exceeding a threshold value.

14. The eNB of claim 13, wherein the maximum pre-backoff probability comprises a first maximum pre-backoff probability, and wherein the communication session circuitry is configured to establish additional communication sessions with one or more additional UEs and the configuration circuitry is configured to send additional RRC messages comprising one or more additional maximum pre-backoff probabilities for the one or more additional UEs.

15. The eNB of claim 14, wherein the one or more additional maximum pre-backoff probabilities comprise a probability different from the maximum pre-backoff probability.

16. The eNB of claim 13, wherein the configuration circuitry is configured to set the pre-backoff duration based on a load on the non-3GPP access point.

17. The eNB of claim 13, wherein the congestion circuitry is configured to move traffic from the non-3GPP access point to the 3GPP network in response to the congestion circuitry detecting the congestion.

18. The eNB of claim 13, wherein the congestion circuitry is configured to determine whether any interference is caused by a neighboring cell, and wherein the eNB further comprises coordination circuitry configured to coordinate with the neighboring cell to reduce traffic in a collision domain of the eNB.

* * * * *